United States Patent [19]

Broach et al.

[11] 4,101,265

[45] Jul. 18, 1978

[54] EQUIPMENT AND PROCESS INVOLVING COMBUSTION AND AIR

[75] Inventors: George C. Broach; Donald W. Thurman, both of Tulsa, Okla.

[73] Assignee: The G. C. Broach Company, Tulsa, Okla.

[21] Appl. No.: 748,885

[22] Filed: Dec. 9, 1976

[51] Int. Cl.² .............................................. F27B 5/16
[52] U.S. Cl. ....................................... 432/29; 34/86;
122/7 R; 165/DIG. 12; 432/209
[58] Field of Search ................. 432/29, 30, 28, 197, 432/209, 212, 223; 165/DIG. 2, DIG. 12; 122/7 R; 126/117; 34/86

[56] References Cited

U.S. PATENT DOCUMENTS

| | | | |
|---|---|---|---|
| 1,608,996 | 11/1926 | Reiser | 122/7 R |
| 1,725,906 | 8/1929 | Gay | 126/117 X |
| 3,623,549 | 11/1971 | Smith, Jr. | 34/86 |

FOREIGN PATENT DOCUMENTS 23,678/69  2/1964  Japan .......................... 165/DIG. 12

*Primary Examiner*—John J. Camby
*Attorney, Agent, or Firm*—Robert E. Massa

[57] ABSTRACT

A method of preheating combustion air being supplied to a furnace, and a furnace including the means for preheating the combustion air. The method comprises circulating a portion of fluid from a fluid stream first in non-contact heat exchange relationship with the flue gas for heat collection, then circulating this portion of fluid in non-contact heat exchange relationship with the combustion air for heat donation thereto. The rate of circulation and temperature of the portion of fluid is controllable substantially independently of the rate of flow and temperature of the parent fluid stream. The furnace comprises means to heat a portion of a fluid stream and includes means to circulate, at a controllable rate and temperature, such portion of fluid from a fluid stream through an adjunct loop connected to the fluid stream for collection of heat from the flue gases and donation of heat to the combustion air.

18 Claims, 8 Drawing Figures

EQUIPMENT AND PROCESS INVOLVING COMBUSTION AND AIR

BACKGROUND OF THE INVENTION

This invention relates broadly to furnaces, boilers, incinerators, and like equipment wherein fuel is burned. More particularly, this invention relates to combustion equipment wherein combustion air is preheated. Still more particularly, this invention relates to combustion equipment wherein combustion air is preheated by a circulatable fluid transferring heat from one section of the equipment to the combustion air.

Equipment requiring the combustion of fuel constitutes a major class of equipment utilized in industry. Typically such equipment comprises settings which define combustion chambers furnished with one or more burners. Upon completion of the combustion process and delivery of the heat generated thereby to its intended sink, the flue gases pass to a stack from which they are vented to the atmosphere.

For equipment with a given fuel input, efficiency depends upon how much of the heat released from the fuel can be recovered. Stated differently, efficiency is an inverse function of flue gas temperature. One approach toward reducing stack temperature is to use the flue gas to preheat combustion air for the burners. This preheating may be accomplished by well known heat exchangers, wherein for example the combustion air is passed on the tube side of a shell and tube exchanger and the flue gas is passed on the shell side (or vice versa) for non-contact heat exchange one with the other. It is also well known to preheat air in regenerative heat exchangers wherein a heat storage mass is contacted alternately with the flue gas for heat collection and then with the combustion air for heat donation. Preheating of combustion air yields high efficiencies and has the added advantage of reducing fuel costs since it becomes unnecessary to heat the combustion air from ambient temperature up to the operating combustion temperature of the unit.

Unfortunately, there must be superimposed on the consideration of efficiency at least the added test of economic justification wherein a compromise must be reached between initial cost and operating cost. It is frequently possible to justify greater initial costs by reducing operating costs, but each equipment installation must usually stand on its own merits.

The economic feasibility of regenerative or indirect type air preheaters is commonly limited to very large equipment installations. One explanation of this limitation is that the cost of this type of preheat equipment does not go down with size as rapidly as basic equipment costs. Economic feasibility of this type of preheat equipment is further aggravated by the problems incident to sealing and moving substantial quantities of gases through large ductwork with fans, as well as the employment of substantial plant area for such ductwork, equipment, and fans. The regenerative type systems have the added burden of additional rotating equipment, usually subject to substantial corrosion, involving considerable maintenance to drives, motors, seals, and other moving parts.

An alternative to the regenerative or indirect type preheat system is the closed loop employing a heat transfer fluid circulated in a non-contact heat exchange relationship first with the flue gas for heat collection and then to the combustion air for heat donation. The inherent difficulties in the closed loop system include the requirement of expansion and surge tanks, inert blanketing systems, maintenance of a supply of inert purging medium, and storage facilities for the heat transfer fluid, together with complex triggering and control systems therefor, to activate an immediate and complete purging of the loop in the event of malfunction of the circulating pump. Metals must be used in the heat collecting coil which will withstand the maximum temperature of flue gas contacting the coil to avoid damage to the coil during those times when the coil is purged and the equipment is still operating.

It is also well known to preheat combustion air utilizing a portion of a process fluid stream entering the equipment for heating wherein the auxiliary stream is divided from the entering process stream and circulated in non-contact heat exchange relationship with combustion air by means of an air preheat coil and then subsequently cycled through a convention economizer coil for collection of heat from effluent flue gases from the equipment before recombining with the process stream either at the process stream's point of entrance into or exit from the equipment.

The inherent disadvantage with the auxiliary stream or slip stream, method of accomplishing the preheating of combustion air lodges in the feature of that system that limits the minimum inlet temperature to the heat donation coil and the minimum outlet temperature from the heat collecting coil to the temperature of the process stream from which the auxiliary stream was divided. It is well known that the driving force for heat transfer is the temperature difference between the fluid which is being heated and the fluid from which that heat is derived. The rate at which the heat flows from one fluid to another increases with that temperature difference, and conversely, the amount of heat absorbing surface, hence the cost thereof, changes inversely with that temperature difference.

In the normal heat exchange relationship, the rate and quantity of heat recovery by convection from flue gases are a function of three temperature differences, viz., flue gas entrance temperature versus flue gas exit temperature; heat collecting fluid entrance temperature versus flue gas exit temperature; and heat collecting fluid exit temperature versus flue gas entrance temperature. The designer, in contemplating an air preheat application, is compelled by economics and the overall heat balance within the system dictated by the physical properties of air and flue gas, to achieve a relatively low flue gas exit temperature from the primary heating service that the equipment is designed for. Or stated another way, relative to a process furnace, the designer must achieve a relatively low differential between the exit flue gas temperature and the incoming process stream temperature.

Relating the foregoing with the outlet temperature from the heat collecting coil, which, in the slip or auxiliary stream concept, cannot be lower than the incoming process stream temperature, the designer is encumbered with an impractically low differential temperature, or driving force, between his heat collecting coil and the flue gas. This condition dictates a heat collecting coil that is physically and economically out of proportion to the quantity of heat available for collection.

Historically, the combustion equipment industry, in utilizing the extant combustion air preheat systems, has been burdened with a choice between different forms of overcomplexity, high maintenance, outsize, or inflexibility, and general application to only the larger combustion applications.

SUMMARY OF THE INVENTION

The primary object of this invention is to provide a method and apparatus for heating combustion air which is efficient, relatively inexpensive, and easy to operate and maintain.

Another object of this invention is to provide a method and apparatus for heating combustion air by using a portion of a parent fluid stream for transferring heat to the combustion air.

Still another object of this invention is to provide a method and apparatus for heating combustion air by indirect heat exchange relationship with a portion of a fluid stream.

Still another object of this invention is to provide a method and apparatus for heating combustion air by use of a portion of a fluid stream in a manner that the temperature of said portion may be controllable substantially independently of the temperature of the parent fluid stream.

Still another object of this invention is to provide a method and apparatus for heating combustion air by use of a portion of a fluid stream in a manner that the rate of flow of said portion may be controllable substantially independently of the rate of flow of the parent fluid stream.

Still another object of this invention is to provide a method and apparatus for heating combustion air by use of a portion of a fluid stream in a manner that the temperature and rate of flow of said portion may be controllable substantially independently of the temperature and rate of flow of the parent fluid stream.

These and other objects of the invention will become apparent from the accompanying description and drawings and attached claims.

This invention embodies a vastly simplified and flexible air preheating system which provides a much lower cost and physical size than previous systems of its nature, and extends to the industry a preheating system generally applicable to all sizes of combustion equipment.

The invention teaches the use of a circulating loop adjunct to a stream of fluid, through which loop fluid is circulated in non-contact heat exchange relationship with effluent flue gas for heat collection and subsequently in non-contact heat exchange relationship with combustion air for heat donation to that combustion air in order to reduce overall fuel input to the equipment. The fluid in the adjunct loop communicates with the parent fluid stream, but is substantially independent of the parent stream with regard to circulation rate and temperature. Thus, fuel economy and overall efficiency are achieved at a much lower cost than would be incident to conventional air preheating systems.

With the ability to control the temperature and rate of circulation of the fluid circulating in the adjunct loop the designer is able to gain the optimum efficiency of the basic equipment as well as provide the most efficient size and cost of the heat collecting coil and the heat donating coil. The necessity to purge the heat collecting coil in the event the circulating device fails is eliminated through the use of a valve in the leg of the adjunct loop downstream from the outlet of the heat collecting coil. The simplicity of the system and its low space requirements make it especially adaptable to installation on existing equipment to increase the efficiency thereof.

Upon loss of the circulating device the valve is opened to allow fluid to flow through the heat collecting coil back into the fluid stream to which the loop is adjunct.

BRIEF DESCRIPTION OF THE DRAWINGS

In the accompanying drawings.

DESCRIPTION OF THE PREFERRED EMBODIMENTS

Figure 1:
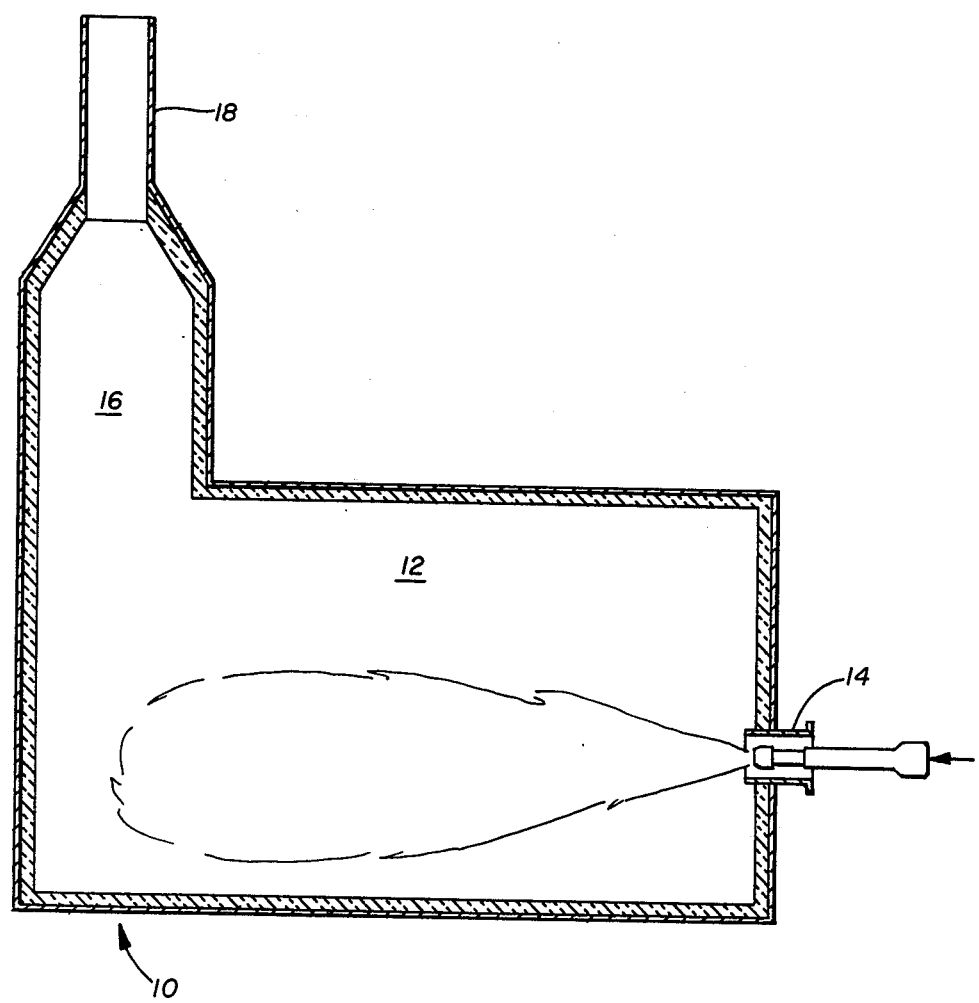
FIG. 1 is a sectional view of a typical furnace.

The present invention has application in a wide variety of equipment in which heating is taking place and from which the flue gas is vented at super-ambient temperatures. For illustrative purposes a typical item of heating equipment is shown in FIG. 1. Setting 10 encloses a radiant section 12 and is fitted with one or more burners 14 firing a mixture of fuel and air to introduce hot combustion gases into the enclosure, from which heat is imparted to material placed or circulated within the envelope of the setting.

Upon imparting heat to the material within the furnace depicted by setting 10, the combustion gases pass through convection section 16 to stack 18 for venting to the atmosphere. The limiting condition for efficiency of equipment in which material is being heated is the lowest temperature of such material in heat exchange relationship with the combustion gases. The flue gas temperature is directly related to the temperature of the material being heated, and can be no lower than the lowest temperature of such material in contact with the flue gas.

Figure 2:
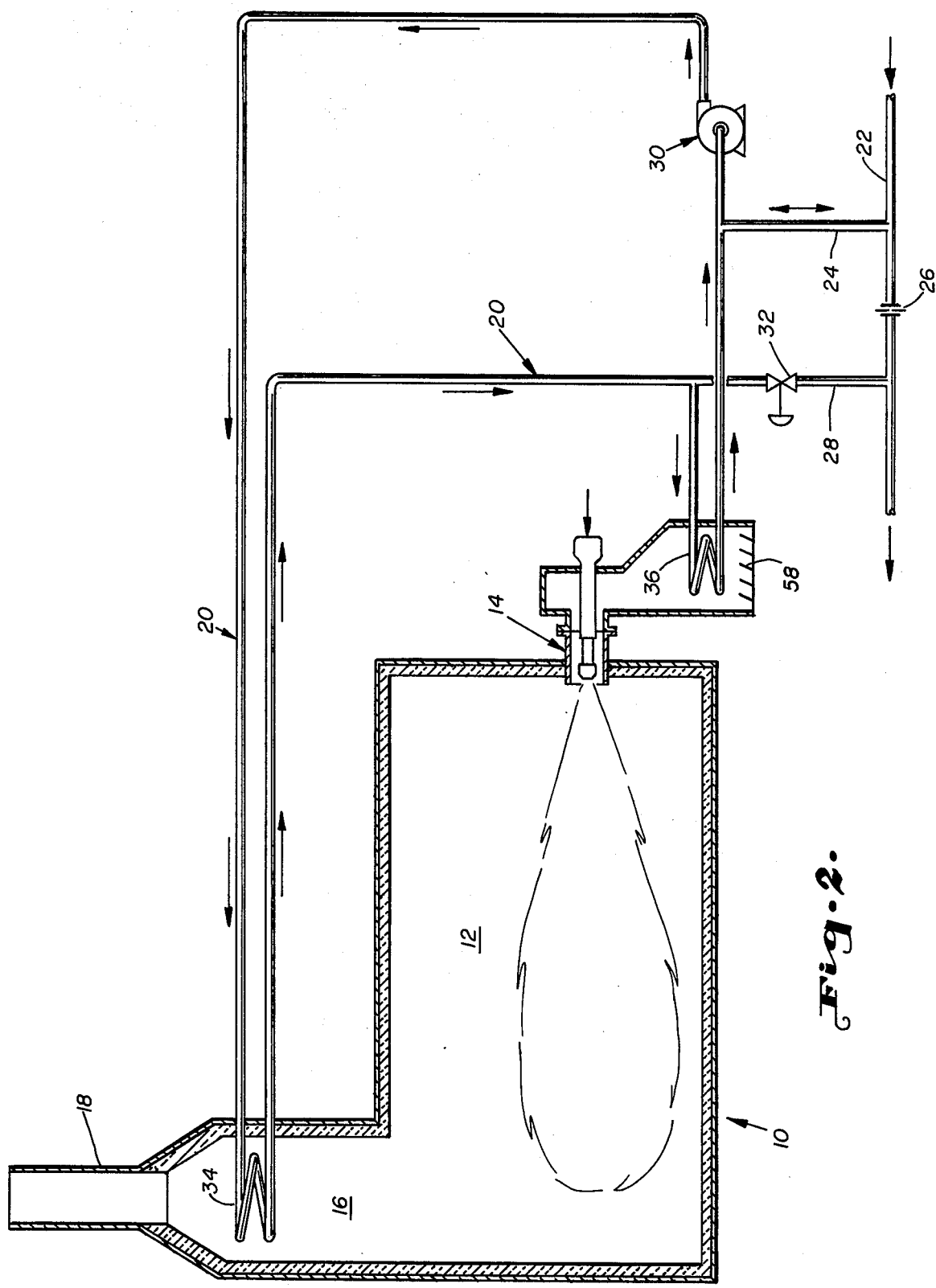
FIG. 2 is a sectional view of a furnace according to this invention.

At the core of this invention is the use of an adjunct loop circulating a stream of fluid to preheat combustion air. As illustrated in FIG. 2, adjunct loop 20 is connected to parent fluid stream 22 by means of fluid leg 24 placed upstream of a pressure differential indicating restriction 26 in the fluid stream and by means of fluid leg 28 placed downstream of the restriction. A circulating device 20 circulates the fluid in the adjunct loop 20, with valve 32 closed, first to a non-contact heat exchange relationship through heat collection coil 34 with the flue gases for heat collection therefrom and thence to a non-contact heat exchange relationship through heat donation coil 36 with the combustion air for heat donation thereto.

When fluid circulating device 30 is operating, the mode of the system is referred to as the operating mode. When fluid circulating device 30 is not operating, the mode of the system is referred to as the non-operating mode.

The circulating rate of the fluid in the adjunct loop is arranged such that the inlet temperature to the heat collection coil 34 (which essentially equals the outlet temperature from the heat donation coil 36) and the outlet temperature from the heat collection coil 34 (which essentially equals the inlet temperature to the heat donation coil 36) are of a magnitude to promote the optimum rate of heat transfer in the two coils. Substantially all of the heat released to the combustion air by the heat donation coil 36 is recovered from the flue gas by the heat collection coil 34, thereby reducing the flue gas temperature exiting the envelope for a corresponding increase in overall thermal efficiency of the equipment. Expansion and contraction of the fluid in the adjunct loop is compensated for by flow, in either direction, in fluid leg 24.

In the event that circulating device 30, which may be a pump, becomes inoperative, valve 32 is opened and, by reason of the pressure differential induced by restriction 26, a portion of fluid stream 22 is allowed to flow through fluid leg 24 thence through heat collection coil 34 thence returning to fluid stream 22 via fluid leg 28, at a rate sufficient to prevent overheating of the material of which coil 34 is constructed.

Figure 6:
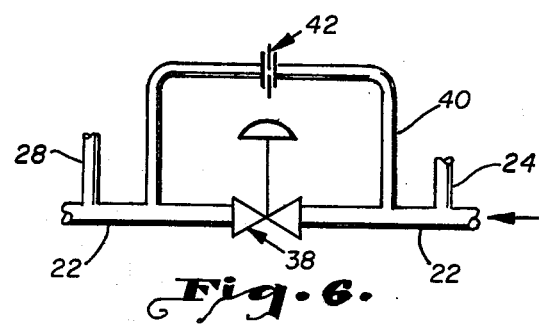

FIG. 6 shows an alternate embodiment for restriction 26 in fluid stream 22. Valve 38, loop 40, and restriction 42 may comprise restriction 26. If it is not desirable or practical to maintain restriction 26 in fluid stream 22 during the operating mode of the adjunct loop 20, valve 38, allowing full flow through fluid stream 22, can be installed in that stream, with bypass loop 40 around valve 38, with restriction 42 therein. During the operating mode valve 38 is in the full open position. In the event circulating device 30 becomes inoperative, valve 38 is closed, directing the flow in fluid stream 22 through restriction 42, thereby creating the required differential pressure between fluid leg 24 and fluid leg 28 to cause flow through adjunct loop 20 to commence at a rate sufficient to prevent overheating of the material of which coil 34 is constructed.

Several alternative arrangements of the connection of the adjunct loop 20 to the fluid stream 22 and of the flow within the adjunct loop 20 are available to obtain the most desirable conditions of temperatures and pressures in both the operating mode and the non-operating mode.

Figure 3:
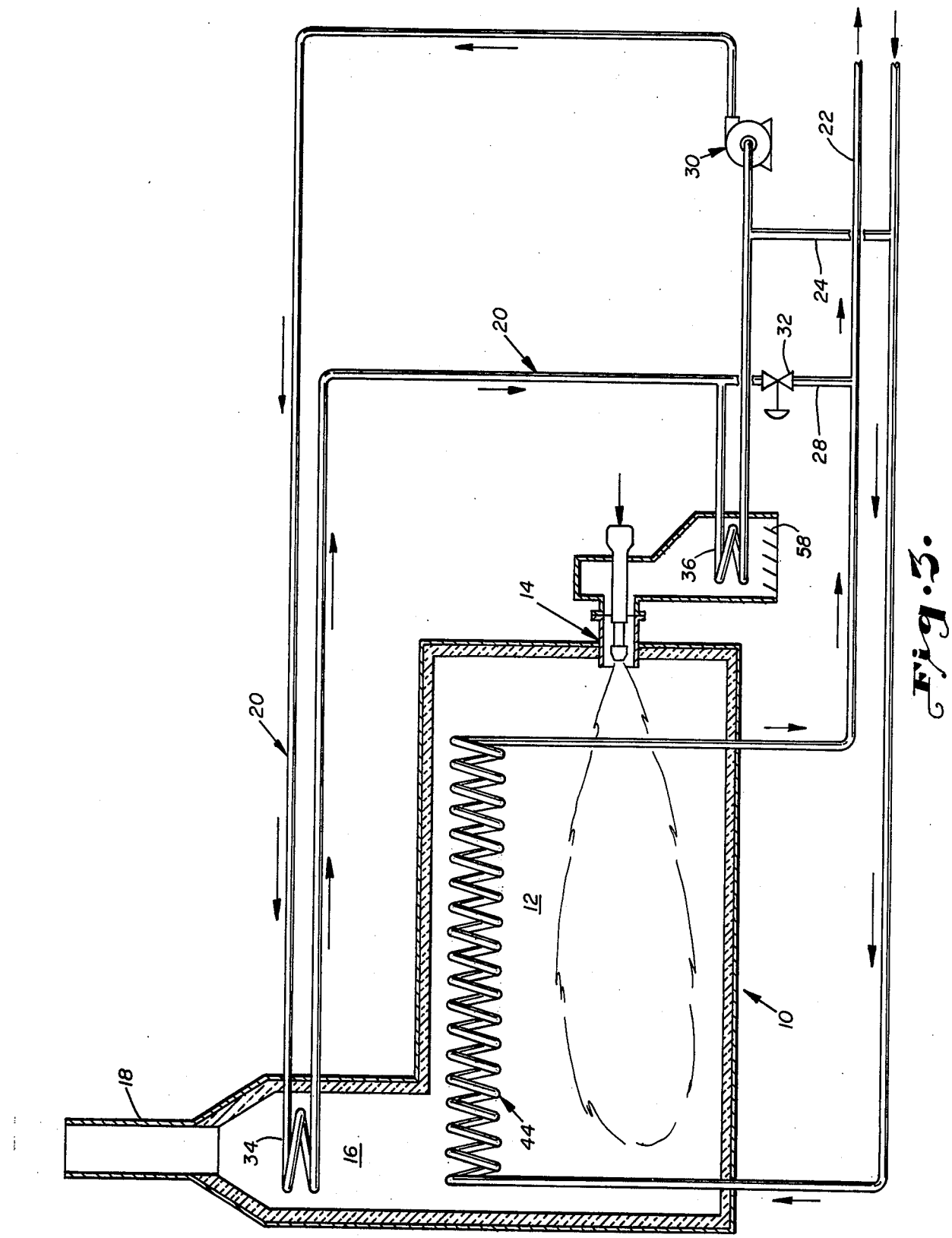
FIG. 3 is a sectional view of a furnace of another embodiment according to this invention.

One alternative arrangement is shown in FIG. 3 wherein fluid stream 22 includes a coil 44 within setting 10 for the collection of heat into fluid stream 22. In effect, coil 44 comprises an alternate flow restriction for restriction 26.

Figure 4:
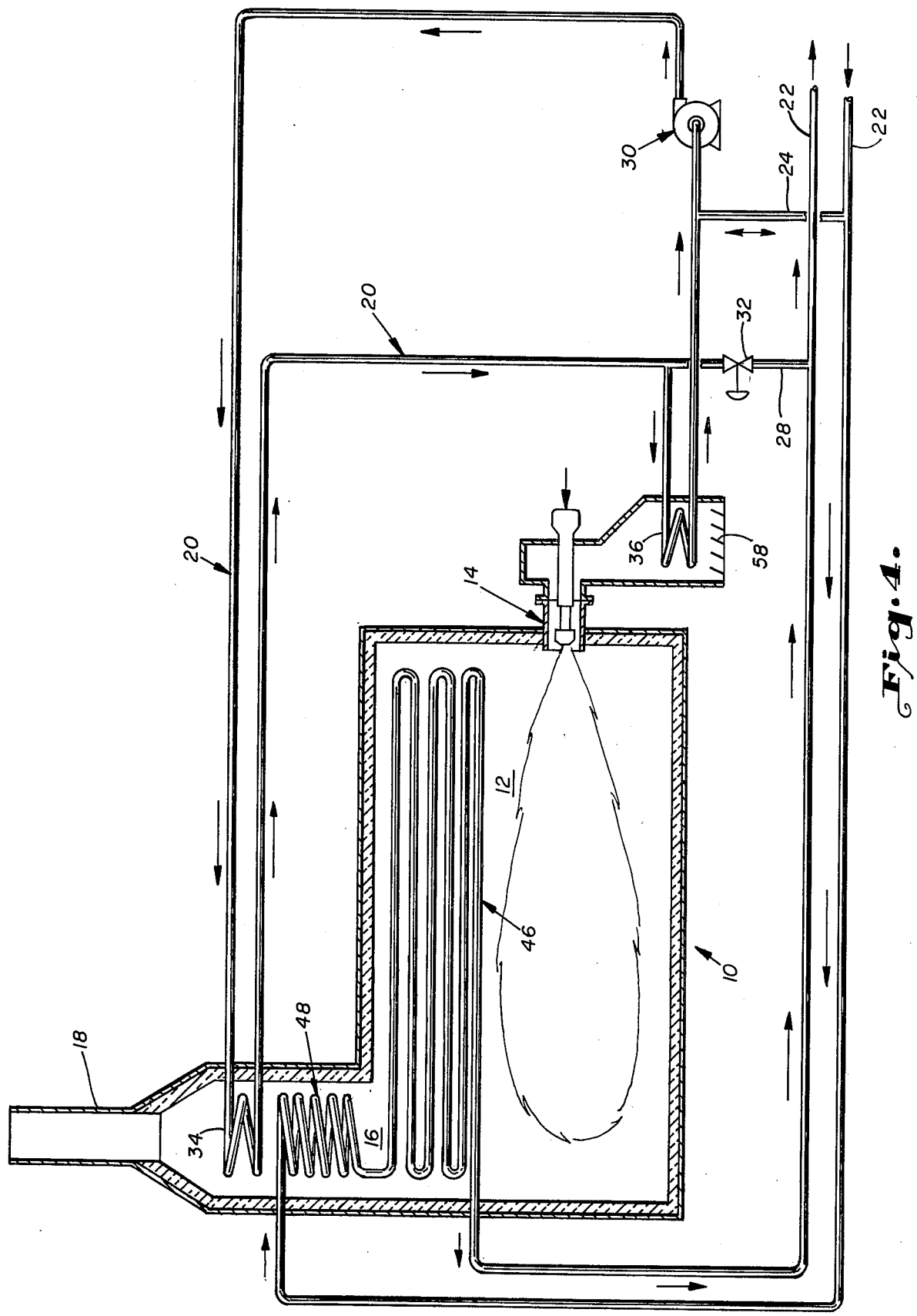
FIG. 4 is a sectional view of a furnace of still another embodiment according to this invention.

FIG. 4 illustrates an embodiment of the present invention in a typical tubular process furnace in refinery or petrochemical service, wherein the fluid stream 22 is circulated through a coil 46 within the envelope of the setting 10, which coil 46 is disposed in the combustion chamber, collecting heat by radiation from the hot combustion gases therein. Coil 46 provides means for the fluid therein to communicate with fluid within a coil 48 disposed within convection section 16 which in turn collects heat by convection from the combustion gases in their course toward discharge to stack 18. Adjunct loop 20 is connected to fluid stream 22 upstream of the coil 48 by means of fluid leg 24, and downstream of coil 46 by means of fluid leg 28. Circulating pump 30 circulates the fluid in the adjunct loop 20 with valve 32 closed, first to a non-contact heat exchange relationship through heat collection coil 34 with the flue gases for heat collection therefrom, and thence to a non-contact heat exchange relationship through heat donation coil 36 with combustion air for heat donation thereto. The circulating rate of the fluid in the adjunct loop is arranged such that the inlet temperature to the heat collection coil 34 (which essentially equals the outlet temperature from the heat donation coil 36) and the outlet temperature from the heat collection coil 34 (which essentially equals the inlet temperature to the heat donation coil 36) are of a magnitude to promote the optimum rate of heat transfer in the two coils. Substantially all of the heat released to the combustion air by the heat donation coil 36 is recovered from the flue gas by the heat collection coil 34, thereby reducing the flue gas temperature exiting the envelope for a corresponding increase in overall thermal efficiency of the equipment. Expansion and contraction of the fluid in the adjunct loop is compensated for by flow, in either direction, in fluid leg 24.

In the event that circulating pump 30 becomes inoperative, valve 32 is opened, and, by reason of the pressure differential incident to the flow of fluid stream 22 through coils 46 and 48, a portion of fluid stream 22 is allowed to flow through fluid leg 24 thence through heat collection coil 34 thence returning to fluid stream 22 via fluid leg 28, at a rate sufficient to prevent overheating of the material of which coil 34 is constructed.

Figure 7:
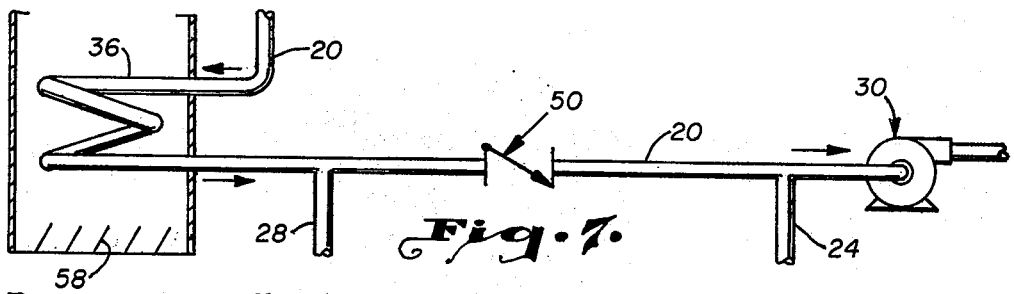
Figure 8:
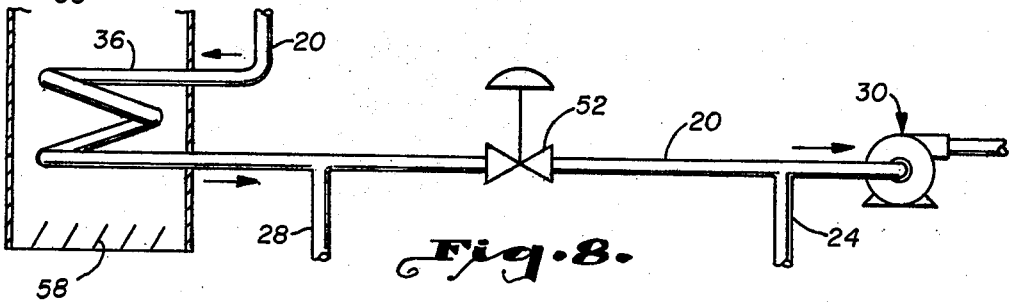

FIGS. 7 and 8 show alternate connections of fluid leg 28 to adjunct loop 20 at a point between the outlet from heat donation coil 36 and circulating pump 30 with valve means 50 or 52 to positively restrict the flow in the non-operating mode to the same direction as in the operating mode.

Figure 5:
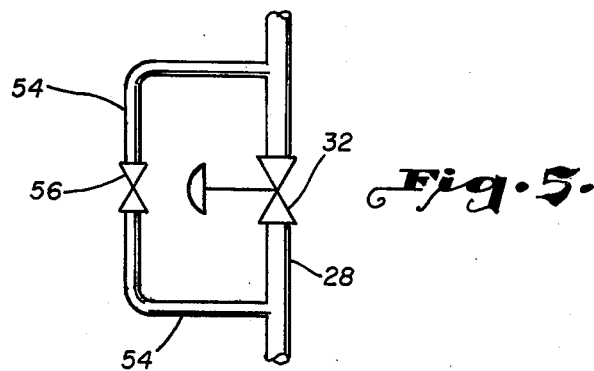
FIGS. 5 through 8 are diagrammatic views of fluid control devices which are incorporated into alternate embodiments of fluid systems according to this invention.

FIG. 5 shows an alternate embodiment for fluid control through and around valve 32 comprising a bypass loop 54 around valve 32 in fluid leg 28, with valve 56 located therein, such that valve 56 can be opened to allow fluid to bypass valve 32 at a desired rate or interval in order to replace the fluid in the adjunct loop 20 by circulating a portion of fluid stream 22 through the adjunct loop 20.

Therefore, FIGS. 2, 3, 4, 7, and 8 show louver means 58 which relates to controlling the overall efficiency of the equipment over the full firing range of the burner 14. By varying the flow of combustion air to the heat donation coil 36 by means of louver 58 in a direct relationship with the amount of fuel consumed, the overall efficiency of the unit can be maintained at the optimum level where the equipment is subject to fluctuations in net heat output, ambient conditions, and other parameters.

It should be borne in mind that heat donation coil 36 need not be located immediately adjacent burner 14. Some form of ducting might be desirable for layout convenience. In addition, it will be understood by those familiar with equipment design that fans could be used to pressurize the combustion air thereby effecting economies in sizing heat donation coil 36.

Experts in equipment design will also appreciate that variations of this invention can find application in modified forms. Dependent upon the defined temperature levels in the adjunct loop and the temperature level of fluid stream 22, the designer may wish to arrange flows and differential pressures, with valves, restrictions, and the like, such that in the non-operating mode the heat transferred in coils 34 and 36 balance each other resulting zero or negligible temperature change in fluid stream 22.

Since many different embodiments of this invention may be made without departing from the spirit and scope thereof, it is to be understood that the specific embodiments described in detail herein are not to be taken in a limiting sense, since the scope of the invention is best defined by the appended claims.

We claim:

1. In a system which includes a furnace for heating a fluid stream, the method of preheating combustion air being supplied to the system which comprises the steps of:

circulating a portion of fluid from said fluid stream first in non-contact heat exchange relationship with the products of combustion of said furnace, then circulating said portion of fluid in non-contact heat exchange relationship with said combustion air.

2. The method of preheating combustion air as described in claim 1 in which the system includes an adjunct loop and the method further comprises:

circulating said portion of fluid through said adjunct loop.

3. The method of preheating combustion air as described in claim 2 which further includes:

replacing fluid in the adjunct loop at a desired rate.

4. The method of preheating combustion air as described in claim 2 including:

restricting the flow of fluid in the fluid stream to cause a portion of said fluid to flow through said adjunct loop.

5. The method of preheating combustion air as described in claim 2 wherein said adjunct loop includes a heat collection coil and a heat donation coil and the steps include:

controlling the rate of circulation in the adjunct loop such that the inlet temperature to the heat collection coil and the outlet temperature from the heat collection coil are of a magnitude to promote an optimum rate of heat transfer between the heat collection coil and the heat donation coil.

6. The method of preheating combustion air as described in claim 2 wherein said furnace includes a convection section having a heat collection coil therein, and at least one burner which fires fuel with combustion air for introduction of hot combustion gases to a radiant section of said furnace for subsequent exit of the combustion gases from the convection section, and the steps include:

circulating the fluid in the adjunct loop first through said heat collection coil for collection of heat from the combustion gases, and thence circulating said fluid in non-contact heat exchange relationship with combustion air for donation of heat thereto.

7. The method of preheating combustion air as described in claim 6 including:

comprising said fluid stream of a fluid hydrocarbon.

8. The method of preheating combustion air as described in claim 7 wherein said furnace includes a first and a second heat collection coil, each disposed within said convection section, said second heat collection coil in series flow communication with a third heat collection coil disposed within said radiant section, and wherein the steps include:

circulating a parent fluid stream through the second heat collection coil and thence through the third heat collection coil, and circulating the fluid in the adjunct loop through the first heat collection coil for heat collection from the flue gases.

9. A furnace for heating material, comprising:

a setting, including a burner to fire fuel with combustion air to introduce hot combustion gases into the furnace, and vent means for exit of combustion gases from the furnace, means for presenting a fluid stream to said furnace, means for circulating a portion of said fluid stream through said furnace, including an adjunct loop, for collection of heat from the combustion gases, and means for circulating the portion of the fluid stream in the adjunct loop in non-contact heat exchange relationship with the combustion air for donating heat thereto.

10. The furnace as described in claim 9, wherein:

the means for circulating a portion of the fluid stream through said adjunct loop includes means for circulating said portion of the fluid stream substantially independently of the temperature of the parent fluid stream.

11. The furnace as described in claim 10, wherein:

the means for circulating a portion of the fluid stream through said adjunct loop includes means for circulating said portion of the fluid stream substantially independently of the rate of flow of the parent fluid stream.

12. The furnace as described in claim 9, wherein:

the means for circulating a portion of the fluid stream through said adjunct loop includes means for circulating said portion of the fluid stream substantially independently of the temperature and rate of flow of the parent fluid stream.

13. The furnace as described in claim 12, wherein the material being heated within said furnace is a fluid, and is the parent fluid stream, and further includes a fluid hydrocarbon.

14. The furnace as described in claim 13, which includes:

a convection section, and wherein the means for circulating a portion of the fluid stream through said adjunct loop includes means for circulating said portion through a heat collection coil disposed within said convection section.

15. The furnace as described in claim 14, wherein the means for circulating the portion of the fluid stream in the adjunct loop in non-contact heat exchange relationship with the combustion air includes a heat donation coil.

16. The furnace as described in claim 15, which includes:

a radiant section, a first and a second heat collection coil, each disposed within said convection section, said second heat collection coil in series flow communication with a third heat collection coil disposed within said radiant section, means for circulating a parent fluid stream through the second heat collection coil and thence through the third heat collection coil, and wherein the means for circulating a portion of the fluid stream through the adjunct loop includes means for circulating said portion through the first heat collection coil.

17. The furnace as described in claim 16 which includes means to proportion the quantity of combustion air contacting the heat donation coil to the quantity of fuel consumed in the furnace.

18. The furnace as described in claim 17 wherein the means to proportion the quantity of combustion air contacting the heat donation coil to the quantity of fuel consumed in the furnace includes adjustable louvers.

* * * * *